United States Patent [19]

Schuler

[11] 4,285,577
[45] Aug. 25, 1981

[54] WINDOW SYSTEM COMPRISING LIGHT POLARIZERS

[75] Inventor: Norman W. Schuler, Lexington, Mass.

[73] Assignee: Polaroid Corporation, Cambridge, Mass.

[21] Appl. No.: 830,208

[22] Filed: Sep. 2, 1977

[51] Int. Cl.$^3$ .............................................. G02F 1/01
[52] U.S. Cl. ..................................... 350/403; 350/407
[58] Field of Search ......... 350/1.6, 147, 153, 156–157, 350/159, 14–15, 111, 132, 276, 283, 403, 407; 351/49; 353/20; 250/225; 40/434, 548

[56] References Cited
U.S. PATENT DOCUMENTS

| | | | |
|---|---|---|---|
| 2,260,220 | 10/1941 | Grabau | 350/159 |
| 2,631,496 | 3/1953 | Rehorn | 350/132 |

*Primary Examiner*—William H. Punter
*Attorney, Agent, or Firm*—Louis G. Xiarhos; Sheldon W. Rothstein

[57] ABSTRACT

A window construction adapted to permit or prevent the transmission of light including first and second fixed polarizer panels, the first of which comprises two adjacent polarizers which are in the same plane, and have their absorption axes perpendicular to each other, and a moveable panel between the fixed panels comprising a wave retarder. The absorption axis of the second polarizer panel is perpendicular to either absorption axis of the polarizers comprising the first panel so that maximum or minimum light transmission through the construction is effected by moving the wave retarder between the fixed polarizer panels. The fixed polarizer panels are generally coincident in size and shape and are positioned in parallel planes.

5 Claims, 4 Drawing Figures

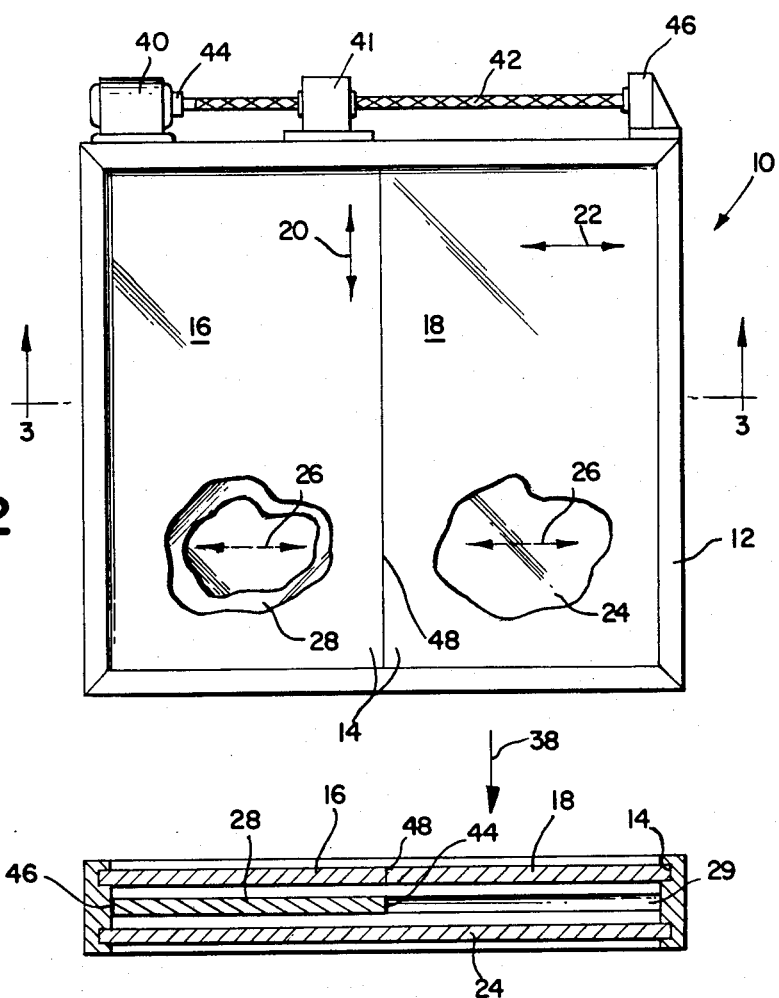
FIG. 2
FIG. 3
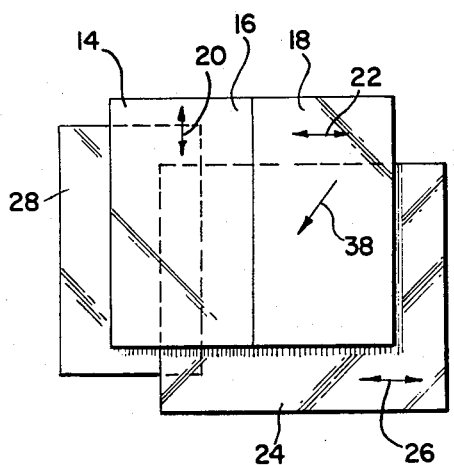
FIG. 1
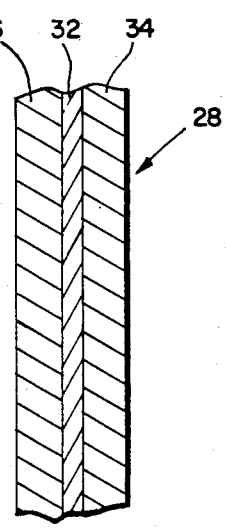
FIG. 4

WINDOW SYSTEM COMPRISING LIGHT POLARIZERS

BACKGROUND OF THE INVENTION

This invention relates to a window construction capable of permitting or preventing light transmission. More particularly, this invention relates to a window construction which utilizes polarizer panels and a movable wave retarder panel to permit or prevent light transmission through the window.

It has been proposed in U.S. Pat. No. 3,528,722 and No. 3,663,089 to provide window structures including a fixed polarizer member and a rotatable polarizer member which permits regulation of light transmission through the window structure depending upon the position of the absorption axis of the rotatable polarizer relative to the position of the absorption axis of the fixed polarizer. These structures are useful in limited applications where windows of generally circular shape are employed, such as airplane windows. However, such structures are undesirable in most windows which are rectangular or relatively large since a space larger than the window would be necessary in order to permit rotation of the rotatable member. In addition, in larger windows such as in the sunroof of an automobile or in building windows, the power requirements for a rotatable window mechanism would be undesirably expensive.

It is desirable to provide a window structure capable of preventing or permitting transmission of light which does not require space in addition to that occupied by the window viewing area. Furthermore, it is desirable to provide such a window structure which does not require the rotation of a window component to regulate light transmission.

SUMMARY OF THE INVENTION

This invention provides a window construction comprising first and second fixed polarizer panels positioned in different planes and a moveable panel interposed between the fixed polarizer panels. The first panel comprises two adjacent (abutting) polarizers which are in the same plane but have their absorption axes oriented perpendicular to each other, while the second panel comprises a single polarizer. The fixed panels are generally similar in size and shape and are in parallel planes. The moveable panel includes a wave retarder on the order of ½, 3/2 or 5/2 waves of retardation with respect to midvisible spectrum light, or about 540 mµ. The axis of absorption of the second polarizer panel is perpendicular to the axis of absorption of either polarizer comprising said first panel (and accordingly parallel to the axis of absorption of the other polarizer comprising said first panel) so that maximum and minimum light transmission through the structure can be effected by sliding the moveable panel between two extreme positions between the fixed panels. In one extreme position, where the moveable panel is superposed between the second panel and the parallel absorption axis component of the first panel, the wave plate functions to twist the electromagnetic vector of the polarized light ninety degrees, thereby giving the effect of crossed polarizers and minimizing light transmission through the window structure. In the second extreme position, where the moveable panel is superposed between the second polarizing panel and the perpendicular absorption axis component of the first panel, the wave plate again functions to twist the electromagnetic vector of polarized light ninety degrees, thereby giving the effect of parallel polarizers and maximizing light transmission throught the window structure.

BRIEF DESCRIPTION OF THE DRAWINGS

FIG. 1 is an exploded schematic depicting the present invention.

FIG. 2 is a top view of one embodiment of this invention.

FIG. 3 is a cross-sectional view of the embodiment of FIG. 2 taken along line 3—3.

FIG. 4 is a sectional view of the moveable wave retarder panel.

DETAILED DESCRIPTION OF SPECIFIC EMBODIMENTS

The window construction of this invention comprises a first fixed polarizer panel having two adjacent polarizers whose light absorption axes are perpendicular to each other and a second fixed polarizer panel spaced in a different parallel plane from the first polarizer panel and comprising a polarizer with its light absorption axis perpendicular to the light absorption axis of one of the polarizer components of the first panel and parallel to the light absorption axis of the other polarizer component of the first panel. A moveable panel betweeen the two fixed panels includes a ½, 3/2 or 5/2 wave retarder which essentially rotates the electromagnetic vector of incident polarized light ninety degrees.

With reference to the exploded schematic of FIG. 1, first polarizer 24 is shown in a plane parallel to the plane of panel 14. Panel 14 comprises second and third adjacent polarizers 16 and 18 which are in the same plane and have their absorption axis oriented perpendicular to each other as indicated by arrows 20 and 22. The absorption axis of polarizer 24 is oriented parallel to the absorption axis of polarizer 18, as indicated by arrow 26. One half wave retarder panel 28 is slidably oriented between polarizer 24 and polarizers 16 and 18 in a plane generally parallel to that of polarizer 24. When panel 28 is coincident with polarizers 16 and 24, the electromagnetic vector of polarized light passing through polarizer 16 is twisted ninety degrees giving the effect as though the absorption axis of polarizer 16 is parallel to that of polarizer 24. Since the absorption axes of polarizers 18 and 24 are parallel, the entire structure is "open"; that is, light may pass through just as it passes through a pair of polarizers with parallel absorption axes. When panel 28 is coincident with polarizers 18 and 24, the electromagnetic vector of light passing through polarizer 18 is twisted ninety degrees giving the effect as though the absorption axis of polarizer 18 is perpendicular to that of polarizer 24. Since the absorption axes of polarizers 16 and 24 are crossed, the entire structure is "closed;" that is, transmission of light will be impeded just as two polarizers having perpendicular absorption axes will impede the passage of light.

The operation of the present invention will be described in greater particularity with reference to FIGS. 2-4 of the drawings. The window construction 10 includes a frame 12. Polarizer panel 14 is secured to frame 12 and includes two polarizer sections 16 and 18 which are positioned so that their absorption axes are perpendicular to each other as indicated by arrows 20 and 22. The polarizer panel 24 also is secured to frame 12 and has its absorption axis normal to the absorption axis of superposed panel section 16 and parallel to the absorption axis of polarizer section 18 as indicated by arrows 26. A movable panel 28 is positioned in a plane between polarizer panels 14 and 24 and is adapted to slide along track 29 in frame 12. The moveable panel comprises a wave retarder 32 between transparent support plates 34 and 36. It may be secured by conventional means known to the art (See FIG. 4). The wave retarder twists the electromagnetic vector of the incident polarized light ninety degrees and will comprise a ½ order, 3/2 order or 5/2 order wave plate; preferably a ½ order wave plate with respect to midspectrum light. If the wave retarder is very high order it would depolarize incident light, and defeat the purpose of the present invention. The panel 28 can be moved by any conventional means including manually. One such means is shown in FIG. 2 and includes an electric motor 40, a nut 41 attached to the top of panel 28 and a threaded shaft 42 which is rotated by the motor 40, which may be reversible. Stops 44 and 46 are attached to shaft 42 so that the panel 28 can be accurately superposed with either panel section 18 or panel section 16. Preferably polarizers 16 and 18 are laminated between transparent supports, such as acrylic support elements.

In operation, when the movable panel 28 is in the position shown in FIG. 3, as explained for FIG. 1, light transmission through the window structure is maximized. The wave retarder 32 twists the polarized light from panel section 16 ninety degrees so that it is transmitted through polarizer panel 24. Similarly, since the absorption axis of the polarizer in panel 24 and panel section 18 are parallel, light transmission through the superposed panel 24 and panel section 18 also is maximized. When panel 28 is moved in a plane between panel 24 and panel section 18, panel section 18 and panel 24 effectively have their absorption axes crossed and the light transmission therethrough is minimized. Transmission through the superposed panel section 16 and panel 24 also is minimized. Thus, it is evident that transmission of incident light 38 through the window structure of this invention can be maximized or minimized merely by virtue of moving panel 28 so that either of its edges 44 or 46 is aligned with the abutting line 48 between panel sections 16 and 18.

Any suitable material which will produce the desired light-polarization effect may be utilized in the present invention. It has been found, however, that polymeric light-polarizing sheet materials lend themselves most readily to this function. The preferred material is a transparent plastic sheet of polyvinylene, preferably polyvinyl alcohol containing substantially oriented molecules of conjugated double bonds which provides its light-polarizing properties. The manufacture and utilization of such sheet material may be appreciated with reference of U.S. Pat. Nos. 2,173,304; 2,255,940; 2,306,108; 2,397,231, 2,445,555; 2,453,168 and 2,674,159.

The wave retarder may comprise, for example, cellulose (di) acetate, cellulose acetate butyrate, oriented polyvinyl alcohol, various oriented polyesters, etc.

As a general rule, it may be stated that neither the polarizer nor the wave plate are structurally sufficiently rigid to be used by themselves. Therefore, in certain embodiments of the present invention, both the polarizer and wave plate may be laminated to one or more rigid synthetic plastic material strata such as, for example, cellulose acetate butyrate, polymethyl methacrylate or glass for support.

Any adhesive materials suitable for bonding the wave plate and polarizer materials to respective support strata may be utilized as long as said adhesive does not hinder the transmission of light. Adhesives which may be used in the environment of the present invention to bond the wave retarder to support strata generally comprise one of a series of partially hydrolyzed polyvinyl alcohol which may be cross-linked in situ with a suitable cross-linking agent. Exemplary of such materials is DuPont's Elvanol 72-60 in conjunction with a zirconyl nitrate cross-linking agent. The most preferred embodiment of this invention utilizes a uniaxially oriented polyvinyl alcohol wave plate bonded directly, on each face, to layers of cellulose acetate butyrate with the above Elvanol adhesive using a standard pressure roll technique. The wave plate-cellulose acetate butyrate sandwich and polarizer-cellulose acetate butyrate sandwiches may be laminated to acrylic support panels, preferably using an adhesive which comprises approximately 4% cellulose nitrate, whose viscosity is approximately 600 to 1,000 seconds$^{-1}$ dissolved in methyl methacrylate monomoner and utilized with a di-isopropyl percarbonate catalyst present in an amount of about one percent, by weight. This latter defined adhesive is further described in U.S. Pat. No. 3,719,544.

In this preferred embodiment, a hard surface coating may be utilized on any or all external surfaces thereof to provide a hard, mar resistant surface. Preferred materials comprise melamine-formaldehyde condensation polymers, and a polyalkylene glycol diester of an $\alpha,\beta$-unsaturated carboxylic acid, such as polyethylene glycol dimethacrylate, etc., which materials and techniques of application are disclosed in U.S. Pat. Nos. 2,397,242; 2,481,809; 3,019,131; 3,091,192 and 3,097,106.

The panel members which may be utilized with the present invention are generally between 0.25 and 0.5 inch in thickness. The wave plate utilized in the structure of the present invention is approximately 1.5 to 5 mils in thickness, to produce the requisite ½, 3/2 or 5/2 wave lengths of retardation. If transparent synthetic plastic support materials are utilized in the composite structure, they will generally comprise methyl methacrylate approximately 30 to 125 mils in thickness and preferably about 60 mils thick. The transparent synthetic plastic protective layers of the instant invention will generally comprise cellulose acetate butyrate from 4 to 30 mils in thickness and preferably about 5 mils thick, and the light-polarizing element of the composites of the present invention will generally be from about 0.75 mils thick. A particularly suitable polarizer panel for use herein is available from Polaroid Corporation identified as K sheet polarizer, though iodine stained polarizer designated HN 36 is also quite suitable.

Modifications can be made in the present invention that are conventional in the art and one considered herein. Such modifications include adding ultra-violet light absorbers, infrared light absorbers, tinting compositions, etc. to the panels of the present invention.

Since certain changes may be made in the above product without departing from the scope of the invention herein involved, it is intended that all matter contained in the above description or shown in the accompanying drawings shall be interpreted as illustrative and not in a limiting sense.

What is claimed is:
1. A light polarizing window comprising:
a first light polarizing element having its absorption axis aligned in a predetermined direction;

a second light polarizing element substantially parallel and superposed with a portion of said first light polarizing element and having its absorption axis perpendicular to the absorption axis of said first light polarizing element;

a third light polarizing element adjacent to said second light polarizing element and coincident with the plane of said second element, said third element being superposed with a portion of said first element and having its absorption axis parallel to the absorption axis of said first polarizer; and a wave retarder of ½, 3/2 or 5/2 waves of retardation with respect to a given wavelength of the visible light spectrum slidably mounted between said first polarizer element and said second and third polarizing elements from a first position where it is between said first and second polarizer elements to a second position where it is between said first and third polarizer elements to effect maximum light transmission or minimum light transmission through said window.

2. The light polarizing window of claim 1 wherein said second and third polarizing elements are adjacent polarizers supported by a common transparent panel.

3. The light polarizing window of claim 1 positioned within the roof of an automobile including means for mechanically moving said wave retarder element between said first and second positions.

4. The light polarizing window of claim 1 wherein the wave retarder element includes a one-half wave retarder.

5. The light polarizing window of claim 1 wherein said given wavelength of the visible spectrum is 540 mμ.

* * * * *